(12) United States Patent
Lee et al.

(10) Patent No.: US 8,945,495 B2
(45) Date of Patent: Feb. 3, 2015

(54) METHOD AND ARCHITECTURE FOR REDUCING NOX AND PARTICULATE MATTER EMISSIONS IN EXHAUST GAS FROM HYDROCARBON FUEL SOURCE WITH A FUEL LEAN COMBUSTION MIXTURE

(75) Inventors: Jong H. Lee, Rochester Hills, MI (US); David B. Brown, Brighton, MI (US); Michael J. Paratore, Jr., Howell, MI (US); Yongsheng He, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 812 days.

(21) Appl. No.: 12/255,069

(22) Filed: Oct. 21, 2008

(65) Prior Publication Data

US 2010/0098612 A1    Apr. 22, 2010

(51) Int. Cl.
*B01D 47/00*     (2006.01)
*B01D 53/56*     (2006.01)
*B01J 21/18*     (2006.01)
(Continued)

(52) U.S. Cl.
CPC ............ *B01D 53/90* (2013.01); *B01D 53/9477* (2013.01); *B01D 53/9418* (2013.01); *B01D 53/9445* (2013.01); *B01D 2251/2062* (2013.01); *B01D 2251/2067* (2013.01); *B01D 2255/1021* (2013.01); *B01D 2255/1023* (2013.01); *B01D 2255/20738* (2013.01); *B01D 2255/20761* (2013.01); *B01D 2255/504* (2013.01); *B01D 2255/9205* (2013.01);

(Continued)

(58) Field of Classification Search
None
See application file for complete search history.

(56) References Cited

U.S. PATENT DOCUMENTS 7,229,597 B2    6/2007  Patchett et al.
7,434,386 B2 *  10/2008 Faas et al. ................. 60/286

(Continued)

FOREIGN PATENT DOCUMENTS

| EP | 1837494 | * | 9/2007 |
|----|---------|---|--------|
| FR | 1999-005872 | * | 5/1999 |
| WO | WO 2007101597 | * | 9/2007 |

OTHER PUBLICATIONS

Enderle, C., G. Vent and M. Paule, "BlueTec Diesel Technology—Clean, Efficient and Powerful", SAE Technical Paper Series, Apr. 2008, p. 1-10, SAE International, Warrendale USA.

(Continued)

*Primary Examiner* — Melvin C Mayes
*Assistant Examiner* — Sheng H Davis
(74) *Attorney, Agent, or Firm* — BrooksGroup

(57) ABSTRACT

An exemplary method and associated architecture for reducing $NO_x$ and particulate matter emissions in an exhaust stream may include passing the exhaust stream through a catalytic oxidation reactor; passing the exhaust stream through a two-way selective reduction catalyst particulate filter located downstream of the catalytic oxidation reactor, wherein the two-way selective reduction catalyst particulate filter may include a wall flow filter substrate having internal walls coated with a first selective catalytic reduction catalyst; and passing the exhaust stream through a catalytic reduction reactor located downstream of the two-way selective reduction catalyst particulate filter, wherein the catalytic reduction reactor may include a second selective catalytic reduction catalyst.

23 Claims, 1 Drawing Sheet

(51) Int. Cl.
  *B01D 5/00* (2006.01)
  *B01D 53/90* (2006.01)
  *B01D 53/94* (2006.01)

(52) U.S. Cl.
  CPC .... *B01D 2258/012* (2013.01); *B01D 2258/014* (2013.01); *Y02T 10/22* (2013.01)
  USPC ............ 423/235; 423/210; 502/185; 422/532

(56) References Cited

U.S. PATENT DOCUMENTS

| | | | |
|---|---|---|---|
| 2003/0209011 A1* | 11/2003 | Duvinage et al. | 60/286 |
| 2004/0206069 A1* | 10/2004 | Tumati et al. | 60/285 |
| 2005/0069476 A1* | 3/2005 | Blakeman et al. | 423/239.1 |
| 2006/0010859 A1* | 1/2006 | Yan et al. | 60/286 |
| 2007/0175208 A1* | 8/2007 | Bandl-Konrad et al. | 60/286 |
| 2007/0214777 A1* | 9/2007 | Allansson et al. | 60/299 |
| 2008/0132405 A1* | 6/2008 | Patchett et al. | 502/74 |
| 2009/0205322 A1* | 8/2009 | Braun et al. | 60/286 |

OTHER PUBLICATIONS

Lee, Jong, Micheal Paratore, David Brown, "Evaluation of Cu-bassed SCR/DPF technology for diesel exhaust emission control", 2007 SAE International.

Bremm, Pfeifer, Leyrer, Mueller, Kruze, Paule, Keppeler, Vent, "Bluetec Emission Control System forthe US Tier2 Bin5 Legislation", SAE Technical Paper Series, Apr. 2008, SAE.

Mattes, Wolfgang, "BMW Diesel", BMW Groups DEER 2007, Aug. 13-16, 2007, p. 1-29, 13th DEER Conference, Detroit.

Dorenkamp, "LNT or Urea SCR Technology: Which is the right technology for Tier 2 Bin 5 passenger vehicles?", Volkswagen AG, Wolfsburg, Aug. 2006, p. 1-31, 12th DEER Conference.

Lee et al., U.S. Appl. No. 12/395,950, filed Mar. 2, 2009, Method and Apparatus for Reducing Nox Emissions from a Lean Burning Hydrocarbon Fueled Power Source.

* cited by examiner

METHOD AND ARCHITECTURE FOR REDUCING NOX AND PARTICULATE MATTER EMISSIONS IN EXHAUST GAS FROM HYDROCARBON FUEL SOURCE WITH A FUEL LEAN COMBUSTION MIXTURE

TECHNICAL FIELD

The present invention relates generally to treatment of exhaust gas from a hydrocarbon fueled power source, such as a diesel engine, operated with a fuel lean combustion mixture. More specifically, this invention pertains to an architecture for the treatment of exhaust gas.

BACKGROUND

Diesel engines, some gasoline fueled engines and many hydrocarbon fueled power plants, are operated at higher than stoichiometric air to fuel mass ratios for improved fuel economy. Such lean-burning engines and other power sources, however, produce a hot exhaust with a relatively high content of oxygen and nitrogen oxides ($NO_x$). In the case of diesel engines, the temperature of the exhaust from a warmed up engine is typically in the range of 200 degrees to 400 degrees Celsius, and has a typical composition, by volume, of about 17% oxygen, 3% carbon dioxide, 0.1% carbon monoxide, 180 ppm hydrocarbons, 235 ppm $NO_x$ and the balance nitrogen and water. These $NO_x$ gases, typically comprising nitric oxide (NO) and nitrogen dioxide ($NO_2$), are difficult to reduce to nitrogen ($N_2$) because of the high oxygen ($O_2$) content in the hot exhaust stream.

SUMMARY OF EXEMPLARY EMBODIMENTS OF THE INVENTION

An exemplary method and associated architecture for reducing $NO_x$ and particulate matter emissions in an exhaust stream may include passing the exhaust stream through a catalytic oxidation reactor; passing the exhaust stream through a two-way selective reduction catalyst particulate filter located downstream of the catalytic oxidation reactor, wherein the two-way selective reduction catalyst particulate filter may include a wall flow filter substrate having internal walls coated with a first selective catalytic reduction catalyst; and passing the exhaust stream through a catalytic reduction reactor located downstream of the two-way selective reduction catalyst particulate filter, wherein the catalytic reduction reactor may include a second selective catalytic reduction catalyst.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary (illustrative) in nature and is in no way intended to limit the invention, its application, or uses.

Figure 1:
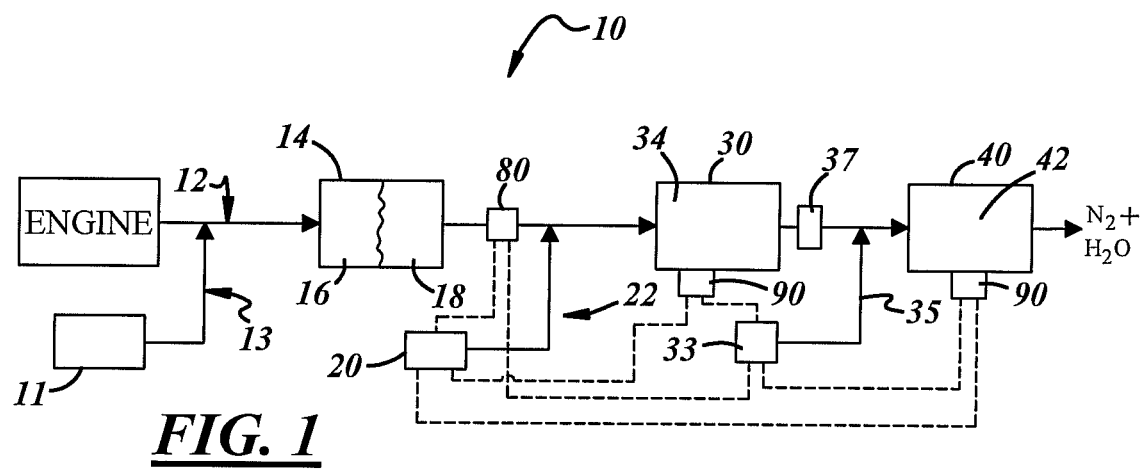
FIG. 1 is a schematic flow diagram of an exhaust system for a lean burn.

A flow diagram of an exhaust system 10 for a hydrocarbon burning engine is illustrated according to one exemplary embodiment in FIG. 1. An exhaust stream 12 from the exhaust manifold of an engine operating at an air-to-fuel mass ratio well above the stoichiometric ratio is to be treated to reduce the $NO_x$ (mainly a mixture of NO and $NO_2$ with some $N_2O$) content to nitrogen ($N_2$). When the exhaust stream 12 is from a gasoline-fueled engine operated, for example, at an air to fuel ratio of greater than 17 (i.e. A/F>17), the exhaust gas contains some unburned hydrocarbons (HC), $NO_x$, carbon monoxide (CO), carbon dioxide ($CO_2$), water ($H_2O$) and nitrogen ($N_2$). The fuel used may include, but is not limited to, gasoline and diesel fuel. The exhaust stream 12 from a diesel engine contains the same gaseous constituents plus suspended diesel particulates (composed of high molecular weight hydrocarbons deposited on carbon particles).

Such hydrocarbon containing exhaust streams 12 may be passed through a catalytic oxidation reactor 14, which substantially completes the oxidation of carbon monoxide to carbon dioxide and the oxidation of hydrocarbons to carbon dioxide and water. There is typically abundant oxygen in the exhaust gas stream 12 for these reactions.

The catalytic oxidation reactor 14, according to one exemplary embodiment as illustrated in FIG. 1, may be a dual zone type catalytic oxidation reactor in which the exhaust stream first passes through a platinum- and palladium-containing front side 16, which may oxidize hydrocarbons and carbon monoxide to carbon dioxide, and subsequently passes through a platinum-rich containing rear side 18, which may oxidize nitrous oxide (NO) to nitrous dioxide ($NO_2$).

Optionally, a hydrocarbon injector device 11 may introduce a hydrocarbon stream 13 to create an exotherm when the exhaust gas stream 12 passes through the catalytic oxidation reactor 14. The exotherm raises the temperature of the exhaust stream 12, which may aid the selective catalytic reduction (SCR) catalysts 34, 42 located downstream. The hydrocarbon injector device 11 may either be a fuel injector from the engine, or may be an external hydrocarbon injector device.

Next, ammonia ($NH_3$) or urea may also be added to exhaust stream 12. Ammonia can be stored in a suitable form (such as aqueous ammonia or urea solution, or a solid ammonia salt) on-board a lean burn engine vehicle, or near-by a stationary engine, collectively referred to herein as an ammonia injector device 20, and may be added as a stream 22 to the exhaust stream 12 upstream of the particulate filter 30 and catalytic reduction reactor 40. The ammonia or urea may participate in the reduction of NO and $NO_2$ to $N_2$.

Next, the $NH_3$ treated exhaust stream 12 may enter a particulate filter 30 that may include a SCR catalyst 34. The particulate filter 30 having the SCR catalyst 34 thus may be referred to as a two-way selective reduction catalyst/particulate filter, or SCR/PF 30.

Figure 2:
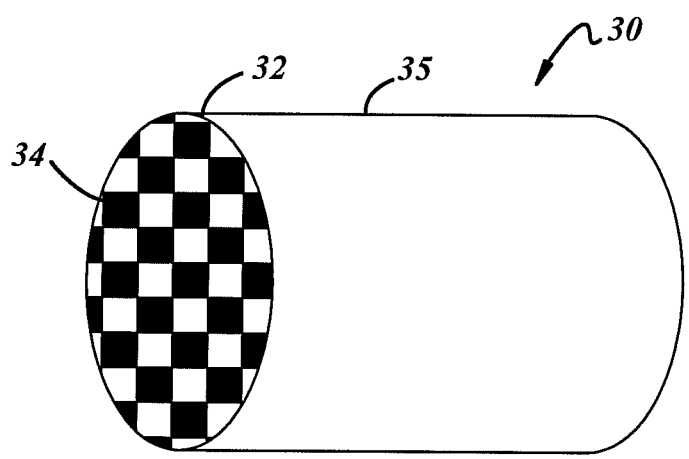
FIG. 2 is an end view of the SCR/PF according to one exemplary embodiment.
Figure 3:
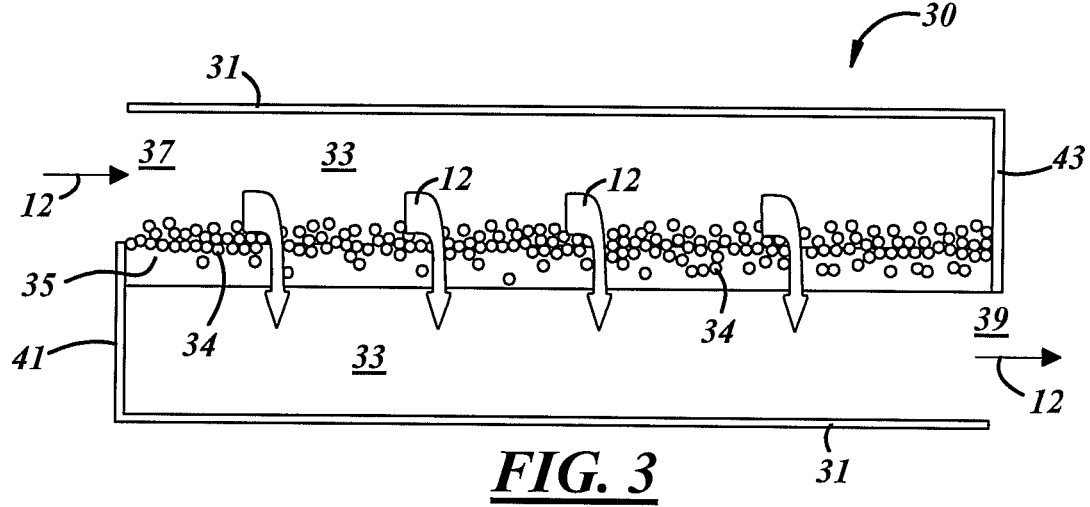
FIG. 3 is a section view of the SCR/PF of FIG. 2.

As best shown in FIGS. 2 and 3, the SCR/PF 30 is formed from a wall flow filter substrate 31 which has a plurality of passages 33. The passages 33 are enclosed by the internal walls 35 of the filter substrate 31. The substrate 31 has an inlet end 37 and an outlet end 39. Alternate passages 33 are plugged at the inlet end 37 with inlet plugs 41 and at the outlet end 39 with outlet plugs 43. The exhaust gas stream 12 enters through the unplugged channel inlet end 37, is stopped by outlet plug 43 and diffuses through channel walls 35 (which are porous) to the outlet end 39. Thus, exhaust gas 12 that passes through the internal walls 35 is filtered to remove particulate matter as a function of the porosity of the channel walls 35.

In addition, the walls of the passages 33, and specifically the internal walls 35, may be coated with the SCR catalyst 34. Thus, exhaust gas 12 flowing through the internal walls 35 or in close proximity to the internal walls 35 also reacts with the SCR catalyst particles 34 to substantially reduce NO and $NO_2$ (i.e. $NO_x$) to $N_2$ and water.

Exemplary wall flow filter substrates 31 may be composed of ceramic-like materials such as cordierite, α-alumina, silicon carbide, silicon nitride, zirconia, mullite, spodumene, alumina-silica-magnesia or zirconium silicate, or of porous, refractory metal. Wall flow substrates 31 may also be formed of ceramic fiber composite materials. Such materials may be able to withstand the high temperatures encountered in treating the exhaust streams. In addition, the substrate materials 31 should provide sufficient porosity after catalyst loading to retain adequate exhaust flow characteristics, in terms of acceptable back pressure.

In one exemplary embodiment, a ceramic wall flow substrate formed of either cordierite or silicon carbide may have a porosity of between about 50 to 75%, while having a mean pore size of between about 5 to 30 microns.

The SCR catalyst 34 may be formed from a washcoat including a base metal as the active material contained in a zeolite material and other support materials. Examples of base metals that may be used in the SCR catalyst 34 formulations in the exemplary embodiments include but are not limited to copper and iron. This base metal may be coupled within a zeolite structure. In one embodiment, the weight percent of active material to the zeolite material may range from about 1 to about 10 weight percent. One exemplary SCR catalyst 34 includes Cu/ZSM-5 catalyst particles containing about 2.5 weight percent of copper. ZSM-5 zeolite was obtained in the hydrogen form (H-ZSN-5) from Zeolyst Corp.

Referring back to FIG. 1, the exhaust stream 12 exits the SCR/PF 30 and may then enter either a dual pipe, a large diameter pipe, or any pipe with a cooling feature (collectively referred to here as a cooling pipe 37) prior to entering the catalytic reduction reactor 40. The cooling pipe 37 may be used between the SCR/PF 30 and the SCR catalyst 42 to cool the exhaust stream 12 during the particulate filter regeneration. The addition of a cooling pipe 37 may aid in protecting the downstream SCR catalysts 42 from high temperature exposure, which may be encountered during the filter regeneration.

The exhaust stream 12 may then enter the catalytic reduction reactor 40 having the selective catalytic reduction (SCR) catalyst 42 downstream from the cooling pipe 37. As stated above, the selective catalytic reduction (SCR) catalyst 42 may function primarily to substantially reduce $NO_x$ to $N_2$ and water.

The SCR catalyst 42 may include a base metal as the active material contained in a zeolite material and other support materials coupled to a conventional substrate material such as cordierite. The base metal may aid in converting NO to $NO_2$ and subsequently converting $NO_2$ to $N_2$ and water which may then be discharged through the tailpipe (not shown) as an emission.

The formulation for the SCR catalyst 42 may be the same, from a compositional standpoint, or different from the formulation of the SCR catalyst 34. In the exemplary embodiments herein, the formulation of the SCR catalyst 42 may be formulated to work more efficiently in a lower temperature environment to store ammonia, thus working as an ammonia slip control agent. In addition, the formulation provides additional $NO_x$ reduction at lower temperatures. In addition, at higher temperatures, the SCR catalyst 42 may be formulated to convert ammonia to nitrogen.

Examples of base metals that may be used in the formulation of the SCR catalyst 42 in the exemplary embodiments include but are not limited to copper and iron. These base metals may be coupled within a zeolite structure. In one embodiment, the weight percent of active material to the zeolite material may range from about 1 to about 10 weight percent. One exemplary SCR catalyst 42 includes Cu/ZSM-5 catalyst particles containing about 2.5 weight percent of copper. ZSM-5 zeolite was obtained in the hydrogen form (H-ZSN-5) from Zeolyst Corp.

The size of the particulate filter 30 and catalytic reduction reactor 40 may vary as a function of the engine size to which it treats the exhaust gas stream 12. In one exemplary embodiment, the size of the particulate filter 30 and catalytic reduction reactor 40 varies between about 0.2 and 2 times the engine displacement. Thus, for a 3 liter diesel engine, for example, the size may vary between about 1.5 and 6 liters, wherein the SCR/PF to engine displacement is about 1-2, while the SCR to engine displacement is about 0.2-1.

In an alternative exemplary arrangement, also shown in FIG. 1, ammonia ($NH_3$) or urea may also be optionally added to exhaust stream 12 from a second ammonia injector device 33 (or from the first ammonia injector device 20), and added as stream 35 to the exhaust stream 12 upstream of the SCR catalyst 42 but downstream of the SCR/PF 30 and cooling pipe 37. The second ammonia injector device 33 may be utilized wherein a higher degree of $NO_x$ conversion efficiency may be desirable.

Maximum reduction performance of the SCR catalyst 34, 42 may often be achieved at a substantially equimolar ratio (1:1 ratio) of NO and $NO_2$ in the exhaust stream 12, especially at lower temperatures (such as start up or warm up conditions for the engine) where the SCR catalyst 34, 42 does not convert $NO_x$ to $N_2$ at its maximum efficiency. In addition, at the 1:1 ratio, the detrimental effects of high space velocity and SCR catalyst 34 aging can be minimized.

For example, where the SCR catalyst 34 or 42 utilizes copper or iron as the base metal such as the Cu/ZSM-5 catalyst material, maximum efficiency for the SCR catalyst 34 or 42 may not be achieved until the SCR catalyst 34 or 42 is heated to about 250 degrees Celsius. At about 250 degrees Celsius and above, the SCR catalyst 34 or 42 may function at a high enough efficiency to convert all the $NO_x$ gases to $N_2$.

In one exemplary embodiment, the injector devices 20, 33 may be coupled to a sensor, such as a $NO_x$ sensor 80 or similar device, which determines the relative amounts of NO and $NO_2$ in the $NO_x$ exhaust gas 12 prior to entering the SCR/PF 30. In addition, or in the alternative, the injector devices 20, 33 may be coupled to a temperature sensor 90 that measures the temperature of the SCR catalyst 34, 42 in the particulate filter 30 and/or catalytic reduction reactor 40.

Thus, the amount of ammonia added to the exhaust stream 12 from either the first injector device 20 or optional second injector device 33 may be separately controlled to introduce a sufficient quantity of ammonia to attempt to reduce NO and $NO_2$ to $N_2$.

The exemplary embodiments provide many advantages compared with conventional after-treatment systems for lean burning engines, which typically consist of a DOC, an SCR catalyst, and a particulate matter filter (DPF) which are placed in series in a specific order to achieve a desired emission reduction performance (i.e. DOC+SCR+PF or DOC+PF+SCR). In particular, the exemplary embodiments may offer a cost advantage and require less fuel for the SCR catalyst warm-up during a cold start situation as compared with conventional after-treatment systems. Also, because only the catalytic oxidation reactor 14 and SCR/PF 30 are heated to high temperatures during filter regeneration, the exemplary embodiments may require lower amounts of fuel and may aid in protecting the SCR catalyst 42 from excessive thermal exposure, which may reduce the $NO_x$ emission reduction, especially during regeneration. As a consequence, the formulation of the SCR catalyst 42 may be modified to provide improved low temperature $NO_x$ emission control (i.e. the SCR catalyst 42 can be formulated to more efficiently convert $NO_x$ to $N_2$ and water, and store excess $NH_3$) efficiently at low start up temperatures, given that the SCR catalyst 42 is protected at higher temperatures due to the cooling pipe 37).

The above description of embodiments of the invention is merely exemplary in nature and, thus, variations thereof are not to be regarded as a departure from the spirit and scope of the invention.

What is claimed is:

1. A system for reducing $NO_x$ and particulate matter emissions in an exhaust stream comprising:
   a catalytic oxidation reactor that oxidizes carbon monoxide, hydrocarbons, and NO wherein said catalytic oxidation reactor comprises a dual zone type catalytic oxidation reactor in which said exhaust stream first passes through a platinum- and palladium-containing front side, which oxidizes hydrocarbons and carbon monoxide to carbon dioxide, and subsequently passes through a platinum-rich containing rear side, which oxidizes nitrous oxide (NO) to nitrous dioxide ($NO_2$);
   a hydrocarbon injector located upstream of said catalytic oxidation reactor that introduces a hydrocarbon stream into said exhaust stream to raise the temperature of said exhaust stream;
   a two-way selective reduction catalyst particulate filter located downstream of said catalytic oxidation reactor, said two-way selective reduction catalyst particulate filter comprising a wall flow filter substrate having internal walls coated with a first selective catalytic reduction catalyst that reduces $NO_x$ to $N_2$;
   a catalytic reduction reactor having a second selective catalytic reduction catalyst that reduces $NO_x$ to $N_2$ located downstream of said two-way selective reduction catalyst particulate filter without an intervening catalytic reactor;
   a cooling pipe located between said two-way selective reduction catalyst particulate filter and said catalytic reduction reactor that allows the exhaust stream to cool before the exhaust stream enters the catalytic reduction reactor; and
   an injector device that injects ammonia or urea into said exhaust stream between said catalytic oxidation reactor and said two-way selective reduction catalyst particulate filter.

2. The system of claim 1 further comprising:
   a second injector device that injects ammonia or urea into said exhaust stream between said two-way selective reduction catalyst particulate filter and said catalytic reduction reactor.

3. The system of claim 2 further comprising:
   a $NO_x$ sensor contained within said exhaust stream and coupled to said injector device and said second injector device, said $NO_x$ sensor located upstream of said two-way selective reduction catalyst particulate filter.

4. The system of claim 2 further comprising:
   a $NO_x$ sensor contained within said exhaust stream and coupled to said injector device and said second injector device, said $NO_x$ sensor located upstream of said two-way selective reduction catalyst particulate filter;
   a temperature sensor coupled to said two-way selective reduction catalyst particulate filter and said injector device, said temperature sensor measuring a temperature of said first selective catalytic reduction catalyst contained in said two-way selective reduction catalyst particulate filter; and
   a second temperature sensor coupled to said catalytic reduction reactor and said injector device, said second temperature sensor measuring a temperature of said second selective catalytic reduction catalyst contained in said catalytic reduction reactor.

5. The system of claim 1 further comprising:
   a $NO_x$ sensor contained within said exhaust stream and coupled to said injector device, said $NO_x$ sensor located upstream of said two-way selective reduction catalyst particulate filter.

6. The system of claim 1 further comprising:
   a temperature sensor coupled to said two-way selective reduction catalyst particulate filter and said injector device, said temperature sensor measuring a temperature of said first selective catalytic reduction catalyst contained in said two-way selective reduction catalyst particulate filter.

7. The system of claim 1 further comprising:
   a temperature sensor coupled to said catalytic reduction reactor and said injector device, said temperature sensor measuring a temperature of said second selective catalytic reduction catalyst contained in said catalytic reduction reactor.

8. The system of claim 1 further comprising:
   a temperature sensor coupled to said two-way selective reduction catalyst particulate filter and said injector device, said temperature sensor measuring a temperature of said first selective catalytic reduction catalyst contained in said two-way selective reduction catalyst particulate filter; and
   a second temperature sensor coupled to said catalytic reduction reactor and said injector device, said second temperature sensor measuring a temperature of said second selective catalytic reduction catalyst contained in said catalytic reduction reactor.

9. The system of claim 1 further comprising:
   a $NO_x$ sensor contained within said exhaust stream and coupled to said injector device, said $NO_x$ sensor located upstream of said two-way selective reduction catalyst particulate filter;
   a temperature sensor coupled to said two-way selective reduction catalyst particulate filter and said injector device, said temperature sensor measuring a temperature of said first selective catalytic reduction catalyst contained in said two-way selective reduction catalyst particulate filter; and
   a second temperature sensor coupled to said catalytic reduction reactor and said injector device, said second temperature sensor measuring a temperature of said second selective catalytic reduction catalyst contained in said catalytic reduction reactor.

10. The system of claim 1, wherein said first selective catalytic reduction catalyst is substantially similar in composition to said second selective catalytic reduction catalyst.

11. The system of claim 1, wherein said first selective catalytic reduction catalyst is substantially dissimilar in composition to said second selective catalytic reduction catalyst.

12. The system of claim 11, wherein said second selective catalytic reduction catalyst has improved low temperature $NO_x$ reduction activity as compared with said first selective catalytic reduction catalyst.

13. The system of claim 1, wherein said catalytic oxidation reactor comprises a dual zone type catalytic oxidation reactor in which the exhaust stream first passes through a front side comprising platinum and palladium and a rear side comprising platinum.

14. The system of claim 1, wherein said two-way selective reduction catalyst particulate filter further comprises wall flow filter substrates comprising cordierite, α-alumina, silicon carbide, silicon nitride, zirconia, mullite, spodumene, alumina-silica-magnesia or zirconium silicate, ceramic fiber composite, or of porous, refractory metal.

15. The system of claim 14, wherein said wall flow filter substrate comprises cordierite or silicon carbide may have a porosity of between about 50 to 75%, while having a mean pore size of between about 5 to 30 microns.

16. The system of claim 1, wherein said first selective reduction catalyst comprises Cu/ZSM-5 catalyst particles containing about 2.5 weight percent of copper.

17. A method for reducing $NO_x$ and particulate matter emissions in an exhaust stream comprising:
passing said exhaust stream through a catalytic oxidation reactor to oxidize carbon monoxide, hydrocarbons, and NO wherein said catalytic oxidation reactor comprises a dual zone type catalytic oxidation reactor in which said exhaust stream first passes through a platinum- and palladium-containing front side, which oxidizes hydrocarbons and carbon monoxide to carbon dioxide, and subsequently passes through a platinum-rich containing rear side, which oxidizes nitrous oxide (NO) to nitrous dioxide ($NO_2$);
introducing a hydrocarbon stream to said exhaust stream upstream of said catalytic oxidation reactor to raise the temperature of said exhaust stream in said catalytic oxidation reactor;
passing said exhaust stream through a two-way selective reduction catalyst particulate filter located downstream of said catalytic oxidation reactor, said two-way selective reduction catalyst particulate filter comprising a wall flow filter substrate having internal walls coated with a first selective catalytic reduction catalyst;
passing said exhaust stream through a cooling pipe located downstream of said two-way selective reduction catalyst particulate filter to cool said exhaust stream;
passing said exhaust stream through a catalytic reduction reactor located downstream of said two-way selective reduction catalyst particulate filter and said cooling pipe without an intervening catalytic reactor, said catalytic reduction reactor having a second selective catalytic reduction catalyst; and
introducing a stream of ammonia or urea to said exhaust stream upstream of said two-way selective reduction catalyst particulate filter and said catalytic reduction reactor.

18. The method of claim 17 further comprising:
introducing a second stream of ammonia or urea to said exhaust stream downstream of said two-way selective reduction catalyst particulate filter and upstream of catalytic reduction reactor.

19. The method of claim 17 further comprising:
coupling a $NO_x$ sensor within said exhaust stream upstream of said two-way selective reduction catalyst particulate filter;
coupling said $NO_x$ sensor to a first ammonia injector device;
measuring a $NO_x$ composition of said exhaust stream using said $NO_x$ sensor; and
determining a quantity of ammonia or urea to introduce to said exhaust stream from said first ammonia injector device as a function of said measured composition from said $NO_x$ sensor, wherein said quantity of ammonia or urea is sufficient to react with a quantity of NO in the exhaust stream to form $NO_2$ and thereby achieve about an equimolar amount of NO and $NO_2$ in said exhaust stream upstream of said two-way selective reduction catalyst particulate filter.

20. The method of claim 17 further comprising:
coupling a $NO_x$ sensor within said exhaust stream upstream of said two-way selective reduction catalyst particulate filter;
coupling said $NO_x$ sensor to an ammonia injector device;
measuring said composition of the exhaust stream using said $NO_x$ sensor;
determining a quantity of ammonia or urea to introduce to said exhaust stream as a function of said measured composition of said exhaust stream, wherein said determined quantity of ammonia or urea is sufficient to react with a quantity of NO in said exhaust stream to form $NO_2$ and thereby achieve about an equimolar amount of NO and $NO_2$ in said exhaust stream upstream of said two-way selective reduction catalyst particulate filter; and
introducing said determined quantity of ammonia or urea from said ammonia injector device to said exhaust stream upstream from said two-way selective reduction catalyst particulate filter as a first stream.

21. The method of claim 17 further comprising:
coupling a $NO_x$ sensor within said exhaust stream upstream of said two-way selective reduction catalyst particulate filter;
coupling said $NO_x$ sensor to a first ammonia injector device and a second ammonia injector device;
measuring the composition of said exhaust stream using said $NO_x$ sensor;
determining a quantity of ammonia or urea to introduce to said exhaust stream as a function of said measured composition of said exhaust stream, wherein said determined quantity of ammonia or urea is sufficient to react with a quantity of NO in said exhaust stream to form $NO_2$ and thereby achieve about an equimolar amount of NO and $NO_2$ in said exhaust stream upstream of said two-way selective reduction catalyst particulate filter;
introducing a first quantity of said determined quantity of ammonia or urea from said first ammonia injector device to said exhaust stream upstream from said two-way selective reduction catalyst particulate filter as a first stream; and
introducing a second quantity of said determined quantity of ammonia or urea from said second ammonia injector device to said exhaust stream downstream from said two-way selective reduction catalyst particulate filter and upstream from said catalytic reduction reactor as a second stream.

22. The method of claim 17 further comprising:
coupling a $NO_x$ sensor within said exhaust stream upstream of said two-way selective reduction catalyst particulate filter;
coupling said $NO_x$ sensor to an ammonia injector device;
coupling a temperature sensor to said second selective catalytic reduction catalyst;
coupling said temperature sensor to said ammonia injector device;
measuring the composition of said exhaust stream using said $NO_x$ sensor;
measuring a temperature of said second selective catalytic reduction catalyst;
determining a quantity of ammonia or urea to introduce to said exhaust stream as a function of said measured composition of said exhaust stream, wherein said determined quantity of ammonia or urea is sufficient to react with a quantity of NO in said exhaust stream to form $NO_2$ and thereby achieve about an equimolar amount of NO and $NO_2$ in said exhaust stream upstream of said two-way selective reduction catalyst particulate filter; and introducing said determined quantity of ammonia or urea from said ammonia injector device to said exhaust stream upstream from said two-way selective reduction catalyst particulate filter as a first stream to substantially achieve said equimolar amount of NO and $NO_2$ when said measured temperature is below a threshold temperature, wherein said threshold temperature is a temperature as sensed by said temperature sensor below which said second selective catalytic reduction catalyst substantially converts $NO_x$ gases in said exhaust stream to nitrogen and water at its maximum efficiency.

23. A system for reducing $NO_x$ and particulate matter emissions in an exhaust stream comprising:

a catalytic oxidation reactor that oxidizes carbon monoxide, hydrocarbons, and NO wherein said catalytic oxidation reactor comprises a dual zone type catalytic oxidation reactor in which said exhaust stream first passes through a platinum- and palladium-containing front side, which oxidizes hydrocarbons and carbon monoxide to carbon dioxide, and subsequently passes through a platinum-rich containing rear side, which oxidizes nitrous oxide (NO) to nitrous dioxide ($NO_2$);

a hydrocarbon injector located upstream of said catalytic oxidation reactor that introduces a hydrocarbon stream into said exhaust stream to raise the temperature of said exhaust stream;

a two-way selective reduction catalyst particulate filter located downstream of said catalytic oxidation reactor, said two-way selective reduction catalyst particulate filter comprising a wall flow filter substrate having internal walls coated with a first selective catalytic reduction catalyst that reduces $NO_x$ to $N_2$ in the presence of ammonia;

a catalytic reduction reactor having a second selective catalytic reduction catalyst that reduces $NO_x$ to $N_2$ in the presence of ammonia located downstream of said two-way selective reduction catalyst particulate filter; and one or more injector devices for injecting ammonia or urea to said exhaust stream located between said catalytic oxidation reactor and said two-way selective reduction catalyst particulate filter and to said exhaust stream located between said two-way selective reduction catalyst particulate filter and said second selective catalytic reduction catalyst.

* * * * *